(12) United States Patent
Daum et al.

(10) Patent No.: US 12,054,881 B2
(45) Date of Patent: Aug. 6, 2024

(54) POLYMER LATEX COMPOSITION FOR FIBRE BINDING

(71) Applicant: Synthomer Deutschland GmbH, Marl (DE)

(72) Inventors: Helmut Daum, Seeheim-Jugenheim (DE); Matthias Renka, Dusseldorf (DE); Gudrun Hill, Leverkusen (DE); Claudia Deutscher, Marl (DE); Dieter Wolters, Dulmen (DE)

(73) Assignee: Synthomer Deutschland GmbH, Marl (DE)

( * ) Notice: Subject to any disclaimer, the term of this patent is extended or adjusted under 35 U.S.C. 154(b) by 0 days.

(21) Appl. No.: 17/688,237

(22) Filed: Mar. 7, 2022

(65) Prior Publication Data

US 2022/0186425 A1 Jun. 16, 2022

Related U.S. Application Data

(62) Division of application No. 15/532,161, filed as application No. PCT/EP2015/077405 on Nov. 24, 2015, now abandoned.

(30) Foreign Application Priority Data

Dec. 2, 2014 (EP) ..................................... 14195791

(51) Int. Cl.
*D06M 15/273* (2006.01)
*C08F 218/08* (2006.01)
*C08F 220/18* (2006.01)
*C08L 31/04* (2006.01)
*C08L 33/06* (2006.01)
*C08L 33/08* (2006.01)
*C08L 33/12* (2006.01)
*C09J 131/04* (2006.01)
*C09J 133/06* (2006.01)
*C09J 143/04* (2006.01)
*D06M 15/285* (2006.01)
*D06M 15/263* (2006.01)
*D06M 15/356* (2006.01)

(52) U.S. Cl.
CPC ......... *D06M 15/273* (2013.01); *C08F 218/08* (2013.01); *C08F 220/1804* (2020.02); *C08L 31/04* (2013.01); *C08L 33/062* (2013.01); *C08L 33/08* (2013.01); *C08L 33/12* (2013.01); *C09J 131/04* (2013.01); *C09J 133/068* (2013.01); *C09J 143/04* (2013.01); *C08L 2201/54* (2013.01); *D06M 15/263* (2013.01); *D06M 15/285* (2013.01); *D06M 15/3566* (2013.01); *D06M 15/3568* (2013.01)

(58) Field of Classification Search
CPC ............. D06M 15/273; D06M 15/263; D06M 15/285; D06M 15/3566; D06M 15/3568; C09J 131/04; C09J 133/068; C09J 143/04; C08F 218/08; C08F 218/04; C08F 220/18; C08F 220/1804; C08F 220/56; C08F 228/02; C08F 220/06; C08F 220/325; C08F 230/085; C08F 230/08; C08L 31/04; C08L 33/062; C08L 33/08; C08L 33/12; C08L 2201/54
See application file for complete search history.

(56) References Cited

U.S. PATENT DOCUMENTS

| | | | |
|---|---|---|---|
| 2,926,154 A | 2/1960 | Keim | |
| 4,959,249 A | 9/1990 | Schilling et al. | |
| 5,342,875 A | 8/1994 | Noda | |
| 5,739,196 A | 4/1998 | Jenkins et al. | |
| 5,977,244 A | 11/1999 | Kohlhammer et al. | |
| 7,566,381 B2 | 7/2009 | Goulet et al. | |
| 2001/0024644 A1 | 9/2001 | Kohlhammer et al. | |
| 2001/0034399 A1 | 10/2001 | Kohlhammer et al. | |
| 2003/0155681 A1 | 8/2003 | Weiler et al. | |
| 2003/0232914 A1* | 12/2003 | Devonport | C09J 11/08 524/501 |
| 2005/0054309 A1 | 3/2005 | Masuda | |

(Continued)

FOREIGN PATENT DOCUMENTS

| | | |
|---|---|---|
| EP | 0306716 A2 | 3/1989 |
| EP | 0894888 A1 | 2/1999 |

(Continued)

OTHER PUBLICATIONS

"Wood", Wikipedia, Nov. 23, 2019, 43 pages, https://en.wikipedia.org/w/index.php?title=Wood&oldid=927555845.

*Primary Examiner* — Karuna P Reddy

(74) *Attorney, Agent, or Firm* — The Webb Law Firm

(57) ABSTRACT

The present invention relates to polymer latex composition for fibre binding comprising: a) 50 to 98 wt.-% based on the total weight of latex particles in the composition of first latex particles having a volume average particle size of 80 to 1000 nm, wherein the first latex particles optionally bear functional groups and if functional groups are present they are selected from functional groups consisting of acid functional groups and salts, amides or anhydrides thereof, silane functional groups, and combinations thereof; b) 2 to 50 wt.-% based on the total weight of latex particles in the composition of second latex particles having a volume average particle size of 5 to 70 nm bearing epoxy functional groups, to the use of that composition for fibre binding, to a fibre structure comprising the dried residue of that composition and to a method for increasing the strength of a fibre structure.

15 Claims, No Drawings

(56) References Cited

U.S. PATENT DOCUMENTS

| | | |
|---|---|---|
| 2009/0264578 A1 | 10/2009 | Minaki et al. |
| 2010/0093913 A1 | 4/2010 | Jones et al. |
| 2012/0263950 A1 | 10/2012 | Gerst et al. |
| 2013/0284668 A1 | 10/2013 | Miller |
| 2013/0317174 A1 | 11/2013 | Nelliappan et al. |

FOREIGN PATENT DOCUMENTS

| | | |
|---|---|---|
| EP | 1136516 A1 | 9/2001 |
| EP | 1336623 A2 | 8/2003 |
| EP | 1347996 B1 | 7/2004 |
| WO | 2005021646 A2 | 3/2005 |
| WO | 2012139941 A1 | 10/2012 |

* cited by examiner

POLYMER LATEX COMPOSITION FOR FIBRE BINDING

CROSS-REFERENCE TO RELATED APPLICATIONS

This application is a divisional of U.S. patent application Ser. No. 15/532,161, filed Jun. 1, 2017, which is the United States national phase of International Application No. PCT/EP2015/077405, filed Nov. 24, 2015, and claims priority to European Patent Application No. 14195791.0, filed Dec. 2, 2014, the disclosures of which are hereby incorporated in their entirety by reference.

BACKGROUND OF THE INVENTION

Field of the Invention

The present invention relates to a polymer latex composition for fibre binding, to a composition for fibre application comprising said polymer latex composition, and to the use of the polymer latex composition for binding fibre, to a fibre structure comprising the dried residue of the polymer latex composition as well as to a method for increasing the strength of a fibre structure.

Technical Considerations

It is well known in the prior art to apply a coating composition to fibre structures such as wovens and non-wovens in order to increase the mechanical strength of these products. One approach that is mainly used commercially is the application of polymeric binder compositions that emit formaldehyde upon curing. Formaldehyde is now considered to be an environmental and health hazard with the result that said approach is no longer desirable, particularly in connection with fibre structures that are used in clothes such as waddings and interlinings or in a hygiene article such as paper towels or diapers. As a consequence, numerous approaches were discussed in the prior art to avoid fibre binding compositions that emit formaldehyde upon curing.

EP-A-0 306 716 discloses cross-linkable copolymer dispersions as binders for non-wovens providing the required strength for the non-wovens whereby the emission of formaldehyde is reduced or even omitted. In these copolymer dispersions, formaldehyde emitting cross-linkable groups such as N-methylolamide or N-methyloletheramides are partially or completely substituted by trialkoxysilane functional groups.

EP-A-0 894 888 relates to a powder binder composition for textile application comprising a carboxyl group containing polymerizate obtained by emulsion polymerization using inter alia N-methylol amide comonomers that will result in formaldehyde emission in powder form in combination with a powder compound containing two or more epoxy or isocyanato groups. The composition in powder form containing epoxy or isocyanato groups is considered as a cross-linker and suitable examples of epoxy cross-linkers are bisphenol A based epoxides.

Similarly, US 2001/0024644 discloses a cross-linkable copolymer composition which can be in the form of a polymer powder, which is re-dispersible in water or as an aqueous dispersion whereby the polymer composition is composed of a copolymer of ethylenically unsaturated compounds and one or more ethylenically unsaturated comonomers containing epoxy groups and, as a second component, one or more non-copolymerizable compounds having at least two epoxy groups. Suitable epoxy compounds which are not capable of free radical polymerization having at least two epoxy groups per molecule are the typical epoxy resins of the bisphenol A type.

EP-A-1 347 996 relates to a cross-linkable dispersion of polymers for treating glass fibres or textile fibres, optionally in the form of wovens or non-wovens. Aqueous dispersions of acrylic polymers, which do not release formaldehyde are disclosed comprising alkoxysilane functional ethylenically unsaturated monomers as well as carboxylic acid functional unsaturated monomers. According to a preferred embodiment described therein, core shell particles are produced whereby the alkoxysilane functional monomers and the carboxylic acid functional monomers are preferably present in the shell.

EP-A-1 336 623 relates to a binder composition in powder form for binding fibres. The binder composition in powder form comprises a first polymerizate in powder form, whereby the polymerizate is obtained from a first set of comonomers that are ethylenically unsaturated, but do not bear additional functional groups and a second set of comonomers that additionally contain functional groups such as N-alkylol amides, carboxylic acid groups, alkoxysilane groups or epoxy groups. The binder composition additionally comprises a compound in powder form which has at least two functional groups that are reactive with the functional groups of the copolymerizate.

US 2005/00054309 discloses a heat-curable binder based on a cross-linkable polymer dispersion comprising an emulsion polymer having carboxylic acid functionality in combination with monofunctional or polyfunctional epoxy compounds as curatives.

WO 2005/021646 discloses a binder system involving the reaction between an epoxy reactive polymer and an epoxy functional polymer that is topically applied to a fibrous web such as a paper towel sheet. This binder can cure at low temperature without emitting formaldehyde. The epoxy reactive polymer is preferably a carboxylic acid functional latex emulsion polymer. As suitable epoxy functional polymers, water soluble poly-functional epoxy resins are disclosed.

US 2013/0284668 A discloses a liquid composition that is particularly useful as a composition for treating a fibre substrate comprising in a first part an emulsion comprising a water insoluble polymer and a water soluble polycarboxylic acid functional polymer and a second part comprising a water insoluble epoxy functional compound. The water insoluble epoxy functional compound can be selected from a typical commercially available epoxy resin.

EP-A-1 136 516 relates to a cross-linkable polymer composition that is suitable as a binder for the preparation of shaped bodies comprising fibre material. The binder composition can be present in the form of an aqueous polymer dispersion or a polymer powder and comprises a first copolymer having a glass transition temperature of above 30° C. comprising copolymers containing ethylenically unsaturated carboxylic acid group in an amount of at least 1 percent by weight based on total monomer and a second copolymer comprising ethylenically unsaturated copolymers having functional groups that are reactive with the carboxylic acid groups of the first copolymer. Suitable co-monomers having functional groups that are reactive with carboxylic acid groups for the second copolymer might be selected preferably from epoxy group, hydroxyl group and isocyanato groups containing monomers.

WO 2012/139 941 relates to a pressure sensitive adhesive dispersion comprising a first emulsion polymer having ureido groups or ureido-analogue groups and a second emulsion polymer comprising epoxy functional groups, but this document is silent with respect to any application for fibre binding.

US 2010/0093913 relates to a coating composition comprising a combination of nanolatex particles having an average particle size of 7-45 nm with conventional latex particles having an average particle size of 60-800 nm. The nanolatex or the conventional latex or both may comprise additional monomers that promote cross-linking. According to one embodiment, cross-linkable monomers are incorporated into either the conventional latex or the nanolatex in order to effect post coalescence cross-linking with an additionally present external cross-linker. In the sole example related to post coalescence cross-linking, a conventional latex made of n-butyl acrylate, n-butyl methacrylate and methacrylic acid is combined with a nanolatex comprising diacetone acrylamide monomers. In the coating composition, as external cross-linker adipic dihydrazide is added. In the general part of the specification, it is disclosed that for the conventional latex as well as the nanolatex glycidyl methacrylate might be copolymerized, but there is no description of the combination of a conventional latex, comprising only optionally functional groups, whereby if such optional functional groups are present, they are selected from a list consisting of acid functional groups, salts or amides thereof, silane functional groups and combinations thereof in combination with a nanolatex bearing epoxy functional groups. Furthermore, US 2010/0093913 does not relate to fibre applications.

Despite the fact that in the prior art numerous approaches are discussed for fibre binding compositions that do not emit formaldehyde upon curing, there is still a need in the industry for fibre binding compositions having improved physical strength without using cross-linkable monomers that upon curing emit formaldehyde.

SUMMARY OF THE INVENTION

This object has been attained by a polymer latex composition for fibre binding comprising:
a) 50 to 98 wt.-% based on the total weight of latex particles in the composition of first latex particles having an average particle size of 80 to 1000 nm, wherein the first latex particles optionally bear functional groups and if functional groups are present they are selected from functional groups consisting of acid functional groups and salts, amides or anhydrides thereof, silane functional groups, and combinations thereof;
b) 2 to 50 wt.-% based on the total weight of latex particles in the composition of second latex particles having an average particle size of 5 to 70 nm bearing epoxy functional groups.

As will be discussed below particularly with reference to the experimental data, it is the surprising result of the present invention that by applying to a fibre structure and curing a composition containing a polymer latex composition comprising first latex particles having a large volume average particle size but only optionally functional groups selected from the group consisting of acid functional groups and salts, amides or anhydrides thereof, silane functional groups and combinations thereof and second latex particles of low particle size bearing an epoxy functional group a fibre structure exhibiting high physical strength can be obtained without emitting any formaldehyde.

In view of the prior art as discussed above teaching that a cross-linking reaction with respect to for example epoxy groups and carboxylic acid groups is essential for achieving the physical strength the present inventors have discovered that the presence of a reactive group in the coating composition that reacts with epoxy functional groups is not necessary for achieving the desired strength. Thus, it is also according to the present invention, if the first latex particles do not contain any functional groups. Carboxylic acid functional groups might only be present in the first latex particle in order to ensure water dispersibility. But they are not necessary for cross-linking with the epoxy functional groups.

As a further surprising result, no additional external cross-linkers are necessary in order to achieve the desired physical strength of the treated fibre structure. This is particularly beneficial for fibre applications wherein the fibre structure is intended to be directly in contact with human skin or in food applications, since additional cross-linkers which are normally low molecular weight cross-linkers may introduce unwanted health hazard. In addition as will be seen from the experimental data the presence of epoxy functional groups on the small second latex particles has a more pronounced effect on the physical strength compared to the coarse first latex particles bearing epoxy functional groups.

Thus, it is a particular advantage of the present invention that fibre application compositions can be formulated without external cross-linkers reactive with epoxy groups selected from polyamines, non-latex polyacids, polythiols and non-latex polyanhydrides.

According to a further aspect, the present invention relates to a composition for fibre application comprising the polymer latex composition of the present invention, selected from
an aqueous composition having a solids content of 5 to 50 wt.-%, preferably 5 to 19 or 20 to 30, or 40 to 50 wt.-% solids based on the total weight of the composition, or
a powder composition comprising the polymer latex composition of the present invention in dried form.

As mentioned above, the fibre application composition is preferably free of external cross-linkers reactive with epoxy groups selected from polyamines, non-latex polyacids, polythioles and non-latex polyanhydrides.

Furthermore, the present invention relates to the use of the polymer latex composition of the present invention or the fibre application composition of the present invention for binding fibres.

According to a further aspect, the present invention relates to fibre structures selected from wovens and non-wovens comprising the dried residue of the polymer latex composition of the present invention or the fibre application composition of the present invention.

Furthermore, the present invention relates to a method for increasing the strength of a fibre structure comprising
providing a fibre structure selected from wovens and non-wovens,
applying a composition comprising the latex composition of the present invention or the fibre application composition of the present invention onto at least a part of the fibre structure,
coalescing the latex particles on at least a part of the fibres of the fibre structure by drying or heating the fibre structure.

DETAILED DESCRIPTION OF THE PRESENT INVENTION

The polymer latex composition for fibre binding according to the present invention can be prepared by mixing at least one aqueous dispersion of first latex particles having a volume average particle size of 80 to 1000 nm and at least one aqueous dispersion of second latex particles having a volume average particle size of 5 to 70 nm.

The mixing ratio of the first and second polymer latex composition is adjusted to provide a final polymer latex composition that comprises 50 to 98 wt % based on the total weight of latex particles in the composition of first latex particles having a volume average particle size of 80 to 1000 nm and 2 to 50 wt % based on the total weight of latex particles in the composition of second latex particles having a volume average particle size of 5 to 70 nm.

The lower limit of the amount of first latex particles in the polymer latex composition of the present invention can be 55, 57, 59, 60, 61, 62, 63, 64, 65, 66, 67, 68, 69, 70, 71, 73, 75. The upper limit of the amount of first latex particles in the polymer latex composition can be 95, 94, 93, 92, 91, 90, 88, 85, 83 or 80 wt % based on the total weight of latex particles in the composition.

In addition, the lower limit of the amount of second latex particles having a volume average particle size of 5 to 70 nm bearing an epoxy functional group in the composition of the present invention can be 5, 6, 7, 8, 9, 10, 11, 13 or 15 wt % based on the total weight of latex particles in the composition. The upper limit of the amount of second latex particles can be 40, 37, 35, 34, 33, 32, 31, 30, 28 or 25 wt % based on the total weight of latex particles in the composition.

According to the present invention, the second latex particles comprise structural units derived from ethylenically unsaturated epoxy functional monomers in an amount of 1 to 50 wt % based on the total weight of monomers for the second latex particles. The lower limit of the amount of structural units derived from ethylenically unsaturated epoxy functional monomers in the second latex particles according to the present invention can be 2, 3, 4, 5, 6, 7, 9, 10, 11, 13, 15 wt % based on the total weight of monomers for the second latex particles. The upper limit of the amount of structural units derived from ethylenically unsaturated epoxy functional monomers can be 45, 42, 40, 38, 36, 34, 32, 30, 28, 26, 24, 22, 20, 18, 17, 16 or 15 wt % of the total weight of monomers for the second latex particles. The second latex particles according to the present invention comprise in addition to the structural units of epoxy functional ethylenically unsaturated monomers structural units of other monomers that are copolymerizable with the epoxy functional monomers in a free radical emulsion polymerization. These additional monomers are considered in the context of the present invention as non-functional monomers, although they contain one or more ethylenically unsaturated groups. Functional monomers of the present invention are monomers that contain a functional group that is maintained on the resultant latex particle after emulsion polymerization. Suitable ethylenically unsaturated non-functional monomers that can be used in the emulsion polymerization for making the second latex particles are selected from ethylenically unsaturated ester compounds, particularly alkyl (meth)acrylates and vinyl esters, vinyl aromatic compounds, conjugated dienes, olefins, vinyl halides, unsaturated nitriles, alkylene di(meth)acrylates, diallyl alkylene compounds, diallyl arylene compounds, divinyl arylene compounds, compounds having at least one allyl group and at least one (meth)acrylate group and combinations thereof.

In general, the preferred alkyl (meth)acrylates may be selected from $C_1$-$C_{10}$ alkyl (meth)acrylate, preferably $C_1$-$C_{10}$-alkyl (meth)acrylates. Examples of such (meth)acrylate monomers include n-butyl (meth)acrylate, secondary butyl (meth)acrylate, ethyl (meth)acrylate, hexyl (meth)acrylate, tert-butyl (meth)acrylate, 2-ethyl-hexyl (meth)acrylate, isooctyl (meth)acrylate, 4-methyl-2-pentyl (meth)acrylate, 2-methylbutyl (meth)acrylate, methyl (meth)acrylate, isopropyl (meth)acrylate, cyclohexyl (meth)acrylate, octadecyl (meth)acrylate, 10-undecenyl (meth)acrylate, 4-tert-butylcyclohexyl (meth)acrylate, ethyl 2-ethyl(meth)acrylate, ethyl 2-propyl(meth)acrylate, isobornyl (meth)acrylate, isooctyl (meth)acrylate, lauryl (meth)acrylate, 3,5,5-trimethylhexyl (meth)acrylate and cetyl (meth)acrylate.

Other suitable esters of (meth)acrylic acid may be selected from di(ethylene glycol) ethyl ether (meth)acrylate, di(ethylene glycol) 2-ethylhexyl ether (meth)acrylate, ethyl cis-(α-cyano) (meth)acrylate, ethylene glycol dicyclopentenyl ether (meth)acrylate, ethylene glycol phenyl ether (meth)acrylate, ethyl 2-(trimethylsilylmethyl) (meth)acrylate, methyl 2-(trifluoromethyl) (meth)acrylate and poly (ethylene glycol) methyl ether (meth)acrylate.

Suitable vinyl esters may be selected from one or more of vinyl acetate, vinyl benzoate, vinyl 4-tert-butylbenzoate, vinyl chloroformate, vinyl cinnamate, vinyl decanoate, vinyl neononanoate, vinyl neodecanoate, vinyl pivalate, vinyl propionate, vinyl stearate, vinyl trifluoroacetate, vinyl valerate, methyl vinyl acetate, vinyl propanoate, vinyl butyrate, vinyl hexanoate, vinyl heptanoate, vinyl octanoate, vinyl 2-propylheptanoate, vinyl nonanoate, vinyl neononanoate, vinyl trifluoroacetate.

Other ethylenically unsaturated ester compounds may be selected from propenyl acetate, methyl propenyl acetate, ethyl propenyl acetate, butenyl acetate, methyl butenyl acetate, propenyl propanoate, dimethyl maleate, diethyl maleate, dipropyl maleate, dibutyl maleate, di 2-ethylhexyl maleate, dimethyl fumarate, diethyl fumarate, dipropyl fumarate, dibutyl fumarate, di 2-ethyl hexyl fumarate, Representatives of vinyl-aromatic monomers include, for example, styrene, α-methylstyrene, p-methylstyrene, t-butylstyrene and vinyltoluene.

Suitable conjugated diene monomers include 1,3-butadiene, isopropene and 2,3-dimethyl-1,3-butadiene.

Unsaturated nitrile monomers include polymerizable unsaturated aliphatic nitrile monomers which contain from 2 to 4 carbon atoms in a linear or branched arrangement, which may be substituted either by acetyl or additional nitrile groups. Such nitrile monomers include acrylonitrile, methacrylonitrile and fumaronitrile, with acrylonitrile being most preferred.

Preferably, the non-functional monomers for the second latex particles are selected from methyl (meth)acrylate, ethyl (meth)acrylate, n-propyl (meth)acrylate, n-butyl (meth) acrylate, 2-ethylhexyl (meth)acrylate, butadiene, isoprene, styrene, alpha-methyl styrene, vinyl acetate, ethylene, propylene, (meth)acrylonitrile, neodecanoic acid vinylester, 2-ethylhexanoic acid vinylester and combinations thereof.

Suitable epoxy functional monomers for the preparation of the second latex particles according to the present invention can be selected from glycidyl (meth)acrylate, allyl glycidylether, vinyl glycidylether, vinyl cyclohexene oxide, limonene oxide, 2-ethylglycidylacrylate, 2-ethylglycidylmethacrylate, 2-(n-propyl)glycidylacrylate, 2-(n-propyl)glycidylmethacrylate, 2-(n-butyl)glycidylacrylate, 2-(n-butyl) glycidylmethacrylate, glycidylmethylmethacrylate, glycidylacrylate, (3',4'-epoxyheptyl)-2-ethylacrylate, (3',4'-epoxyheptyl)-2-ethylmethacrylate, (6',7'-epoxyheptyl)acrylate, (6',7'-epoxyheptyl)methacrylate, allyl-3,4-epoxyheptylether, 6,7-epoxyheptylallylether, vinyl-3,4-epoxyheptylether, 3,4-epoxyheptylvinylether, 6,7- epoxyheptylvinylether, o-vinylbenzylglycidylether, m-vinylbenzylglycidylether, p-vinylbenzylglycidylether, 3-vinyl cyclohexene oxide and combinations thereof.

The second latex particles according to the present invention can comprise structural units from other functional monomers. Suitable functional monomers other than the epoxy functional monomers can be selected from the functional monomers that will be discussed below in more detail for the first latex particle. Particularly suitable additional functional monomers are monomers bearing acid functional groups and salts, anhydrides or amides thereof in order to adjust the water dispersibility of the second latex particles. As optional additional functional monomers, ethylenically unsaturated monomers such as (meth)acrylic acids are preferred.

The amount of structural units derived from functional ethylenically unsaturated monomers other than epoxy functional monomers in the second latex particles can be at most 10, 8, 6, 5, 4, 3 or 2 wt % based on the total weight of monomers for the second latex particles. If functional ethylenically unsaturated monomers other than epoxy functional monomers are used for the preparation of the second latex particles, the lower limit can be 0.1 or 0.3 or 0.5 wt % based on the total weight of monomers used for the preparation of the second latex particles according to the present invention.

The fine particle dispersion containing the second latex particles according to the present invention can be prepared by standard emulsion polymerization processes. One possibility according to the present invention is a semi-continuous emulsion polymerization with internal nucleation. As it is well known to a person skilled in the art, the emulsion polymerization is conducted in presence of an appropriate surfactant. A suitable surfactant can be selected from alkali metal or ammonium salts of ($C_8$ to $C_{12}$) alkyl sulfates, ($C_8$ to $C_{18}$) alkyl ether sulfates having 3 to 30 ethylene oxide units, ($C_{12}$ to $C_{18}$) alkane sulfonic acids, secondary ($C_8$ to $C_{18}$) alkane sulfonates, ($C_9$ to $C_{18}$) alkyl aryl sulfonic acids, mono- or di-($C_5$ to $C_{15}$) alkyl sulfosuccinate esters. For preparation of the aqueous dispersion of the second polymer latex particles, the surfactant may be present in the emulsion polymerization process in amounts of 1-13 wt.-%, preferably 1.2-11 wt.-%, more preferred 1.4-9 wt.-%, most preferred 1.6-7 wt.-%, based on the total weight of monomers.

In order to adjust the volume average particle size of the second latex particles according to the present invention, the amount of surfactant is higher compared to the preparation of the aqueous dispersion of the first latex particles according to the present invention.

The lower limit for the volume average particle size of the second latex particles according to the present invention can be 8, 10, 12, 14, 16, 18 or 20 nm. The upper limit of the volume average particle size of the second latex particles according to the present invention can be 65, 60, 54, 50, 48, 46, 44, 42, 40, 38, 36 or 35 nm.

Furthermore, the emulsion polymerization process for the preparation of the aqueous dispersions of the first and second latex particles according to the present invention is conducted in presence of a suitable free-radical initiator. The free-radical initiators can be selected according to the present invention from initiators that are capable of initiating an emulsion polymerization in aqueous medium. Suitable initiators can be peroxide, azo compounds or redox initiator systems. Suitable peroxide can be selected from inorganic peroxo compounds such as hydrogen peroxide or peroxodisulfates for example selected from mono- or di-alkali metal or ammonium salts of the peroxodisulfuric acid. Also suitable are organic peroxide such as tert.-butyl, p-mentyl, or cumyl hydroperoxide, or dialkyl or diaryl peroxides such as di-tert-butyl or di-cumyl peroxide The free-radical initiators can be employed in the emulsion polymerization process according to the present invention in amounts of 0.1-5 wt.-%, preferably 0.15-4 wt.-%, more preferred 0.2-3 wt.-%, most preferred 0.25-2 wt.-% based on the total weight of monomers.

The first latex particles having a volume average particle size of 80 to 1000 nm according to the present invention optionally bear functional groups selected from functional groups consisting of acid functional groups and salts, anhydrides or amides thereof, silane functional groups and combinations thereof. The optional functional groups are introduced into the first latex particles by copolymerizing non-functional ethylenically unsaturated compounds having only one or more ethylenically unsaturated groups with ethylenically unsaturated compounds having acid functional groups or salts, anhydrides or amides thereof and/or silane functional ethylenically unsaturated compounds. The total amount of such functional monomers to be used in the preparation of the first latex particles can be up to 5 wt % based on the total weight of monomers for the first latex particles. The lower limit of such functional monomers can be 0, 0.1, 0.2, 0.4, 0.5, 0.6, 0.7, 0.8, 0.9 or 1 wt % based on the total weight of monomers for the first latex particles. The upper limit of the total amount of such functional monomers can be 4.5, 4.3, 4.0, 3.8, 3.6, 3.4, 3.2, 2.0, 1.9 or 1.8 wt % based on the total weight of monomers for the first latex particles.

The first latex particles according to the present invention may comprise structural units derived from
i) non-functional monomers having only ethylenically unsaturated functional groups selected from alkyl (meth)acrylates, vinyl aromatic compounds, conjugated dienes, vinyl esters, olefins, vinyl halides, (meth) acrylonitrile, alkylene di(meth)acrylates, diallyl alkylene compounds, diallyl arylene compounds, divinyl arylene compounds, compounds having at least one allyl group and at least one (meth)acrylate group and combinations thereof; and optionally
ii) functional monomers selected from
acid functional monomers selected from (meth)acrylic acid, itaconic acid, crotonic acid, maleic acid, fumaric acid, ethylenically unsaturated sulfonic acids, ethylenically unsaturated phosphorous containing acids and salts thereof;
ethylenically unsaturated alkoxy silanes, preferably vinyl trimethoxy silane, vinyl triethoxy silane or (meth)acryloyloxy alkyl trialkoxy silanes;
(meth)acrylamides;
and combinations thereof.

The non-functional monomers for the first latex particles can be selected from those as described above for the second latex particles. Preferred non-functional monomers for the first latex particles according to the present invention can be selected from methyl (meth)acrylate, ethyl (meth)acrylate, n-propyl (meth)acrylate, n-butyl (meth)acrylate, 2-ethylhexyl (meth)acrylate, butadiene, isoprene, styrene, alpha-methyl styrene, vinyl acetate, ethylene, propylene, (meth) acrylonitrile, neodecanoic acid vinylester, 2-ethylhaxanoic acid vinylester and combinations thereof.

Examples of ethylenically unsaturated sulfonic acid monomers comprising sulfonate, sulfonic acid, sulfonic ester, sulfonamide or sulfonyl halide groups include sodium vinyl sulfonate, sodium (meth)allyl sulfonate, 2-methyl-2-propene-1-sulfonic acid sodium salt and 2-acrylamido-2- methylpropane sulfonic acid sodium salt, 3-sulfopropyl (meth)acrylate, sodium α-methylstyrene sulfonate, sodium ethyl styrene sulfonate, sodium 1-allyloxy-2-hydroxypropyl sulfonate. Likewise, linear or branched $C_1$-$C_{10}$-alkylsulfonamides of acrylic acid or of methacrylic acid are suitable. Also suitable are ω-alkene-1-sulfonic acids having 2 to 10 C atoms. Other examples include, vinylsulfonic acid, (meth) allylsulfonic acid, methallylsulfonic acid, 2-(meth)acrylamido-2-methylpropanesulfonic acid, 2-acrylamidoethanesulfonic acid, 2-acryloyloxyethanesulfonic acid, 2-methacryloyloxyethanesulfonic acid, 3-acryloyloxypropanesulfonic acid, 2,2-ethylhexylaminoethane sulfonic acid and 2-methacryloyloxypropanesulfonic acid, sulfoethyl methacrylate, sulfopropyl methacrylate, sodium 4-vinylbenzenesulfonic acid, isopropenylbenzenesulfonic acid and vinyloxybenzenesulfonic acid.

Ethylenically unsaturated phosphorous containing acids may be selected from the group consisting of vinylphosphonic acid (and methyl ester), 2-propene phosphonic acid (and diethyl ester), phosphoric acid 2-hydroxyethyl (meth)acrylate ester, 2-(methacryloyloxy)ethyl phosphate, α-(dialkylphosphonate) acrylate, β-(dialkylphosphonate) acrylate, dialkylphosphonate (meth)acrylate, N-(dialkylphosphonate) (meth) acrylamide, dimethyl (methacryloyloxy) methyl phosphonate, dialkyl vinyl phosphonates (such as dimethyl vinyl phosphonate, diethyl vinyl phosphonate, diisopropyl vinyl phosphonate), allylphosphonic acid and allylphosphonic acid monoammonium salt, dimethyl-1-allyloxymethylphosphonate, dialkyl vinyl ether phosphonates (such as 2-vinyloxyethyl phosponate), diethyl 2-butenylphosphonate, bis(2-methacryloxyethyl)phosphate, phosphate esters of polyethylene glycol monomethacrylate, phosphate esters of polypropylene glycol mono(meth)acrylate, para-vinylbenzyl phosphonate, diethylbenzyl phosphonate, and salts and esters thereof.

An aqueous dispersion of the first latex particles according to the present invention can be prepared by emulsion polymerization as described above for the second latex particles. Particularly, the emulsion polymerization is performed in the presence of a suitable surfactant and free radical initiator. The same surfactants and free radical initiators and amounts of free radical initiators as discussed above with respect to the emulsion polymerization of the first latex particles can be used.

In order to adjust the particle size of the first latex particles according to the present invention, the surfactants are used in lower amounts compared to the amounts disclosed with respect to the preparation of the second latex particles. Suitable amounts of surfactants for the emulsion polymerization for the preparation of the first latex particles are 0.1-5 wt.-%, preferably 0.15-4 wt.-%, more preferred 0.2-3 wt.-%, most preferred 0.25-2 wt.-% based on the total weight of monomers.

Alternatively or additionally the polymerization of the first latex particles can be conducted in the presence of an external seed in order to adjust the particle size of the first latex particles. A wide range of seed lattices can be employed such as polyalkylacrylates, polystyrene, styrene-alkylacrylate-copolymers, styrene-butadiene-copolymers or combinations thereof. The volume average particle size of the seed latex may range from greater 0 to 80 nm, preferably from 10 to 60 nm, more preferred from 15 to 55 nm, most preferred from 20 to 50 nm. The external seed can be used in amounts of 0.05 to 5 wt.-%, preferably 0.1 to 4 wt.-%, more preferred 0.5 to 3.5 wt.-%, most preferred 1 to 3 wt.-% based on the total weight of monomers.

The lower limit for the volume average particle size of the first latex particles can be 90 nm, 100 nm, 105 nm or 110 nm. The upper limit for the volume average particle size of the first latex particles can be 900 nm, 800 nm, 700 nm, 600 nm, 500 nm, 400 nm, 350 nm, 300 nm, 270 nm, 250 nm, 230 nm, 210 nm or 200 nm.

As discussed above, the aqueous dispersion of the first latex particles and the aqueous dispersion of the second latex particles can be combined and mixed in the respective amounts in order to provide the polymer latex composition of the present invention containing the first and second latex particles in the relative amounts as required by the present invention.

The polymer latex composition of the present invention can be used to formulate a fibre application composition. The fibre application composition according to the present invention can be selected from an aqueous composition having a solid content of 5 to 50 wt %, preferably 5 to 19 or 20 to 30 or 40 to 50 wt % based on the total weight of the composition or a powder composition comprising the polymer latex composition of the present invention in dried form.

Aqueous compositions having a solid content of 5 to 19 wt % are particularly suitable for spraying onto non-woven or shoulder pads. Fibre application compositions having a solid content of 20 to 30 wt % are particularly suitable for foam impregnation, for example for the preparation of diapers or interlinings. Fibre application compositions having a solid content of 40 to 50 wt % are particularly suitable for bath impregnations, for example for the preparation of synthetic leather base.

Fibre application compositions in the form of powder compositions are particularly suitable as binders for the preparation of shaped articles comprising fibrous material.

A particular advantage of the present invention is that the latex composition of the present invention after coalescing and drying on the fibres provide sufficient strength to the fibre structure without the presence of any external cross-linker. Thus, it is particularly preferred that the fibres application compositions of the present applications are free of external cross-linkers that are reactive with epoxy groups selected from polyamines, non-latex polyacids, polythioles and non-latex polyanhydrides. The polymer latex composition or the fibre application composition of the present invention can be used for binding fibres.

Suitable fibres can be selected from synthetic fibres, preferably selected from polyester fibres, polyamide fibres, polypropylene fibres and polyethylene fibres, mineral fibres preferably selected from glass fibres and ceramic fibres, carbon fibres, natural fibres preferably selected from cellulose fibres, cotton fibres, wool fibres, hemp fibres and wood fibres.

The fibres can be present in the form of a fibre structure selected from woven and non-woven. Thus, the present invention is also directed to a fibre structure selected from wovens and non-wovens comprising the dried residue of the polymer latex composition of the present invention or the fibres application composition of the present invention.

The fibre structure can be selected from paper towels, hygienic papers, household papers, wet wipes, diapers, interlinings, waddings, shoulder pads, synthetic leather base material, textile supported gloves and wood fibre panels.

Depending on the final end use, the fibre application composition according to the present invention can be applied to the various fibre based structures as known to a person skilled in the art.

For example the application composition can be applied by spray coating, bar coating or roll coating. Alternatively foam coating can be employed by for example by using a bar or a knife for application of the foam onto the substrate to be coated. It is also possible to impregnate the substrate with the foam by directing the substrate between two rollers whereby the foam composition is fed to the nip formed by the rollers.

The present invention will now be described in more detail with reference to the following examples.

In the examples following abbreviations are used:

List of Abbreviations

| Abbreviation | |
|---|---|
| BA | Butyl acrylate |
| MMA | Methyl methacrylate |
| AAm | Acrylamide |
| AS | Acrylic acid |
| MAS | Methacrylic acid |
| VS | Vinyl sulfonate |
| VTMO | Vinyl trimethoxy silane |
| VAM | Vinyl acetate Monomer |
| STY | Styrene |
| GMA | Glycidyl methacrylate |
| DAAM | Diacetone acrylamide |
| ADH | Adipic dihydrazide |
| PS | Particle size |
| PL-PSDA | Polymer Laboratories-Particle Size Distribution Analyzer |
| Dv | Volume Average Particle Size |
| Visc. | Viscosity |
| Brookf. | Brookfield viscometer |
| TSC | Total Solids Content |

Determination of Physical Parameters:

The dispersions were characterised by determination of total solids content (TSC), pH value, viscosity (Brookfield LVT) and particle size (PL-PSDA).

Determination of Total Solid Contents (TSC):

The determination of total solids content is based on a gravimetric method. 1-2 g of the dispersion are weighed on an analysis balance into a tarred aluminium dish. The dish is stored for 1 h at 120° C. in a circulating air oven until constant mass is reached. After cooling to room temperature the final weight is determined again. The solids content is calculated as follows:

$$TSC = \frac{m_{initial} - m_{final}}{m_{initial}} 100\%$$ $m_{initial}$ = initial weight, $m_{final}$ = weight after drying Determination of pH Value:

The pH value is determined according to DIN ISO 976. After 2 point calibration with buffer solutions the electrode of a Schott CG 840 pH meter was immersed in the dispersion at 23° C. and the constant value on the display was recorded as pH value.

Determination of Viscosity:

The viscosities were determined at 23° C. with an Brookfield LVT viscometer. Approximately 220 ml of the liquid (freed of air bubbles) was filled into a 250 ml beaker and the spindle of the viscometer was immersed up to the mark. The viscometer is then switch on and after approximately 1 minute the value is recorded until it is constant. The viscosity range determines the choice of spindle and rotational speed and the factor for the recorded value to calculate the viscosity. The information about spindle and revolutions per minute are shown in brackets in the tables 2 and 4.

1-90 mPas (spindle1/60 revolutions per minute)

20-180 mPas (spindle1/30 revolutions per minute)

100-900 mPas (spindle1/6 revolutions per minute)

500-4500 mPas (spindle2/6 revolutions per minute)

2000-18000 mPas (spindle3/6 revolutions per minute)

Determination of Particle Size:

The particle sizes were determined with the Particle Size Distribution Analyser from Polymer Laboratories (PL-PSDA). The separation of particles is based on the principal of hydrodynamic fractionation in a plug flow (CHDF). Due to the velocity distribution in the plug flow the retention time of particles increases with decreasing particle diameter. After fractionation the particles are detected with a UV-detector. A correlation of particle size with retention time is achieved by calibrating with polymer dispersion standards of different average particle sizes from Duke Scientific.

Samples from the dispersions were diluted two times with eluent solution (concentrate provided by PL) by adding 1 drop dispersion to 5 ml eluent solution followed by adding 6-10 drops of this dilution to 5 ml eluent solution again, all at 23° C. The closed phials with the dilutions were placed in the autosampler of the PL-PSDA and three portions were measured by passing over column 2 through the device. The average value for the volume average particle diameter (Dv) was determined from 3 separate readings and listed in tables 2 and 4 for the coarse particle dispersion and the fine particle dispersions respectively.

EXAMPLES

Preparation of Coarse Base Polymer Dispersion:

The coarse base polymer dispersions were prepared via seeded semicontinous emulsion polymerisation. The polymerisations were carried out in a 2 L 6-necked glass reactor endowed with reflux condenser, blade stirrer and thermoelement placed in a thermostat Lauda Proline P 26 with temperature control device.

The reactor was charged with 427 g deionised water, 3.4 g sodium secondary ($C_{13}$-$C_{17}$) alkane sulphonate (TSC 30%), 0.1 g tripotassium phosphate and 42.5 g acrylate seed dispersion (TSC 30%, volume average particle diameter 35 nm) and heated up to 80° C. 5 minutes after shot addition of 10.2 g sodium peroxodisulfate solution (TSC 5%) the addition of 93.8 g sodium peroxodisulfate solution (TSC 5%) and monomer pre-emulsion with compositions according to table 1 were added parallel over 300 minutes at 80° C. After finalisation of additions the pre-emulsion vessel was rinsed with 5 g deionised water and the reactor content was stirred for further 210 minutes at 80° C. 30 minutes after end of additions 2.9 g hydrogen peroxide solution (TSC 35%) were added in one shot and 120 minutes after end of additions 20.4 g sodium meta bisulfite solution (TSC 5%) were dosed over 90 minutes. Thereafter the reaction mixture was cooled to room temperature and 0.4 g of paraffin oil based defoamer were added before sieving over filter screen (90 µm).

The dispersions were characterised by determination of total solids content (TSC), pH value, viscosity (Brookfield LVT) and particle size (PL-PSDA). The values are listed in table 2

TABLE 1

Coarse base Polymer
Composition of pre-emulsion [g]

| coarse emulsion | 1 | 2 | 3 | 4 | 5 | 6 | 7 | 8 | 9 | 10 |
|---|---|---|---|---|---|---|---|---|---|---|
| Deionised. Water | 360.3 | 361.2 | 361.4 | 360.2 | 361.1 | 361.4 | 329.5 | 288.4 | 360.1 | 288.5 |
| Emulsifier 30%* | 39.3 | 39.3 | 39.3 | 39.3 | 39.3 | 39.3 | 39.3 | 39.3 | 39.3 | 39.3 |
| VAM 100% | 764.5 | 733.9 | 733.9 | 764.5 | 733.9 | 733.9 | 744.1 | 744.1 | 759.4 | 744.1 |
| BA 100% | 233.1 | 233.1 | 242.3 | 222.9 | 222.9 | 232.1 | 233.1 | 222.9 | 222.9 | 243.3 |
| VS 25% | 12.2 | 12.2 | 12.2 | 12.2 | 12.2 | 12.2 | 12.2 | 12.2 | 12.2 | 12.2 |
| AS 100% | 9.2 | 9.2 | / | 9.2 | 9.2 | / | 9.2 | 9.2 | 9.2 | 9.2 |
| AAm 50% | 20.4 | 20.4 | 20.4 | 20.4 | 20.4 | 20.4 | 20.4 | 20.4 | 20.4 | 20.4 |
| VTMO 100% | / | / | / | 10.3 | 10.3 | 10.2 | 10.2 | 10.3 | 15.5 | / |
| GMA 97% | / | 31.6 | 31.6 | / | 31.6 | 31.6 | / | / | / | / |
| DAAM 100% | / | / | / | / | / | / | 10.2 | 20.4 | / | 10.2 |

*sodium ($C_{10}$-$C_{14}$) alkyl ether sulfate (3-10 ethylene oxide)

Coarse Base Polymers Characteristics:

TABLE 2

| Comonomer composition [wt.-%] | TSC [%] | pH | viscosity Brookf. LVT [mPas] | PS (Dv) PL PSDA [nm] |
|---|---|---|---|---|
| 1 74.95% VAM/22.85% BA 1% Aam/0.3% VS/0.9% AS | 49.5 | 2.2 | 1022 (2/6) | 139 |
| 2 71.95% VAM/22.85% BA 1% Aam/0.3% VS/0.9% AS 3% GMA | 50.9 | 2.4 | 1506 (2/6) | 138 |
| 3 71.95% VAM/23.75% BA 1% Aam/0.3% VS/3% GMA | 50.3 | 2.3 | 1215 (2/6) | 137 |
| 4 74.95% VAM/21.85% BA 1% Aam/0.3% VS/1% VTMO 0.9% AS | 49.4 | 2.3 | 101 (1/30) | 140 |
| 5 71.95% VAM/21.85% BA 1% Aam/0.3% VS/1% VTMO 0.9% AS/3% GMA | 49.9 | 2.2 | 150 (1/6) | 143 |
| 6 71.95% VAM/22.75% BA 1% Aam/0.3% VS/1% VTMO 3% GMA | 50.2 | 2.5 | 255 (1/6) | 133 |
| 7 72.95% VAM/22.85% BA 1% AAm/0.3% VS/1% VTMO 0.9% AS/1% DAAM | 50.8 | 2.9 | 200 (1/6) | 136 |
| 8 72.95% VAM/21.85% BA 1% AAm/0.3% VS/1% VTMO 0.9% AS/2% DAAM | 49.2 | 3.4 | 85 (1/60) | 143 |
| 9 74.45% VAM/21.85% BA 1% Aam/0.3% VS 1.5% VTMO/0.9% AS | 49.7 | 2.3 | 190 (1/6) | 141 |
| 10 72.95% VAM/23.85% BA 1% AAM/0.3% VS 0.9% AS/1% DAAM | 49.7 | 3.2 | 1246(2/6) | 132 |

Preparation of Fine Particle Dispersion:

The fine particle dispersions were prepared via semicontinous emulsion polymerisation with internal nucleation. The polymerisations were carried out in a 2 L 6-necked glass reactor endowed with reflux condenser, blade stirrer and thermo element placed in a thermostat Lauda Proline P 26 with temperature control device.

The reactor was charged with 694.5 g deionised water and 58.8 g sodium ($C_{12}$-$C_{16}$) alkyl sulfate (TSC 30%) and heated up to 80° C. 5 minutes after shot addition of 27.6 g ammonium peroxodisulfate solution (TSC 5%) followed by 7.8 g deionised water for rinsing the addition of monomer pre-emulsion with compositions according to table 3a was added over 120 minutes at 80° C. After the addition of the pre-emulsion was finalised the pre-emulsion vessel was rinsed with 7.9 g deionised water and the reactor content was stirred for further 90 minutes at 80° C. Thereafter the reaction mixture was cooled to room temperature and 2.0 g of biocide (CIT/MIT 1.5% solution) were added followed by sieving over filter screen (90 μm). The reactor and the sieve was rinsed with 34.5 g deionised water into the dispersion.

The amount of emulsifier in the reactor charge was reduced in order to prepare the dispersions with higher particle size. The reduced amount was then added before biocide addition at room temperature to ensure the same final composition.

105: 28.0 g reactor charge/30.8 g before biocide
106: 14.0 g reactor charge/44.8 g before biocide

TABLE 3a

Fine particle polymer dispersion
Composition of pre-emulsion [g]

| fine particle dispersion | 101 | 102 | 103 | 104 | 105 | 106 | 107 | 108 |
|---|---|---|---|---|---|---|---|---|
| Deionis. Water | 628.4 | 632.7 | 632.7 | 632.7 | 637.0 | 637.0 | 637.0 | 637.0 |
| Emulsifier 30%* | 7.4 | 7.4 | 7.4 | 7.4 | 7.4 | 7.4 | 7.4 | 7.4 |
| MMA100% | 276.8 | 216.8 | 216.8 | 216.8 | 216.8 | 216.8 | 216.8 | 205.1 |
| BA 100% | 316.9 | 316.9 | 256.9 | 316.9 | 256.9 | 256.9 | 260.2 | 256.9 |
| MAS 100% | 6.3 | 6.3 | 6.3 | 6.3 | 6.3 | 6.3 | 3.0 | 18.0 |
| GMA 97% | 61.9 | 123.7 | 61.9 | 123.7 | 123.7 | 123.7 | 123.7 | |
| DAAM 100% | | | | | | | | |
| VTMO 100% | | | | | | | | |
| VAM 100% | | | | | | | | |
| STY 100% | | | | | | | | |

| Raw material | 109 | 110 | 111 | 112 | 113 | 114 |
|---|---|---|---|---|---|---|
| Deionis. Water | 637.0 | 637.0 | 641.3 | 628.4 | 628.4 | 628.4 |
| Emulsifier 30%* | 7.4 | 7.4 | 7.4 | 7.4 | 7.4 | 7.4 |
| MMA100% | | | 156.8 | 291.8 | 306.8 | 216.8 |
| BA 100% | 256.9 | 256.9 | 256.9 | 256.9 | 256.9 | 256.9 |
| MAS 100% | 6.3 | 6.3 | 6.3 | 6.3 | 6.3 | 6.3 |
| GMA 97% | 123.7 | 123.7 | 185.6 | | | |
| DAAM 100% | | | | 45.0 | 30.0 | |
| VTMO 100% | | | | | | 120.0 |
| VAM 100% | 216.8 | | | | | |
| STY 100% | | 216.8 | | | | |

*sodium ($C_{12}$-$C_{16}$) alkyl sulfate (TSC 30%)

Due to viscosity constraints, the solid content had to be reduced to 20% TSC for the preparation of the dispersions with higher DAAM content (>10 phm). These dispersions were prepared as follows.

The reactor was charged with 463 g deionised water and 39.2 g sodium ($C_{12}$-$C_{16}$) alkyl sulfate (TSC 30%) and heated up to 80° C. 5 minutes after shot addition of 18.4 g ammonium peroxodisulfate solution (TSC 5%) followed by 5.2 g deionised water for rinsing the addition of monomer preemulsion with compositions according to table 3b was added over 120 minutes at 80° C. After the addition of the preemulsion was finalised the pre-emulsion vessel was rinsed with 5.2 g deionised water and the reactor content was stirred for further 90 minutes at 80° C. Thereafter the reaction mixture was cooled to room temperature and 1.3 g of biocide (CIT/MIT 1.5% solution) were added followed by sieving over filter screen (90 µm). The reactor and the sieve were rinsed with 23.0 g deionised water into the dispersion.

TABLE 3b

Fine particle reactive polymer dispersion
Composition of pre-emulsion [g]

| Raw material | 115 | 116 |
|---|---|---|
| Deionised Water | 1110.2 | 1109.8 |
| Emulsifier 30%* | 4.9 | 4.9 |
| MMA100 % | 184.5 | 144.5 |
| BA 100% | 171.3 | 171.3 |
| MAS 100% | 4.2 | 4.2 |
| DAAM 100% | 40.4 | 80.8 |

*sodium ($C_{12}$-$C_{16}$) alkyl sulfate (TSC 30%)

The dispersions were characterised by determination of total solids content (TSC), pH value, viscosity (Brookfield LVT) and particle size (PL-PSDA). The values are listed in table 4

TABLE 4

Fine particle dispersion Characteristics

| | Comonomer composition [wt.-%] | TSC [%] | pH | viscosity Brookf. LVT [mPas] | PS (Dv) PL PSDA [nm] |
|---|---|---|---|---|---|
| 101 | 52.8BA/46.2 MMA/1.0MAS | 29.4 | 3.3 | 1358 (2/6) | 29 |
| 102 | 52.8BA/36.2 MMA/1.0MAS/10GMA | 30.1 | 3.9 | 234 (1/6) | 32 |
| 103 | 42.8BA/36.2 MMA/1.0MAS/20GMA | 30.1 | 4.3 | 417 (2/6) | 20 |
| 104 | 52.8BA/36.2 MMA/1.0MAS/10GMA | 29.6 | 3.5 | 458 (1/6) | 22 |
| 105 | 42.8BA/36.2 MMA/1.0MAS/20GMA | 29.9 | 4.8 | 71 (1/60) | 34 |
| 106 | 42.8BA/36.2 MMA/1.0MAS/20GMA | 29.8 | 4.5 | 25 (1/60) | 45 |
| 107 | 43.4BA/36.1 MMA/0.5MAS/20GMA | 30.0 | 4.3 | 579 (2/6) | 11 |
| 108 | 42.8BA/34.2 MMA/3.0MAS/20GMA | 30.1 | 4.1 | 250 (1/6) | 28 |
| 109 | 42.8BA/36.2 VAM/1.0MAS/20GMA | 29.7 | 3.9 | 155 (1/6) | 27 |
| 110 | 42.8BA/36.2 STY/1.0MAS/20GMA | 30.1 | 4.0 | 256 (1/6) | 32 |
| 111 | 42.8BA/26.2 MMA/1.0MAS/30GMA | 30.0 | 4.6 | 321 (1/6) | 29 |
| 112 | 42.8BA/48.7 MMA/1.0MAS/7.5 DAAM | 29.5 | 3.4 | 6616 (3/6) | 30 |
| 113 | 42.8BA/51.2 MMA/1.0MAS/5.0 DAAM | 29.6 | 4.2 | 3013 (2/6) | 28 |
| 114 | 42.8BA/36.2MMA/1.0 MAS/20 VTMO | 29.0 | 2.7 | 26 (1/60) | 38 |
| 115 | 42.8BA/46.2 MMA/1.0MAS/10 DAAM | 19.6 | 3.8 | 11 (1/60) | 11 |
| 116 | 42.8BA/36.2 MMA/1.0MAS/20DAAM | 19.8 | 3.7 | 12 (1/60) | 9 |

Reference Examples 1-10, Comparative Examples 1-15, Examples 1-14

The blends of the base polymer dispersions were prepared by weighing the given amounts of the respective coarse particle and fine particle dispersions in table 5 (wet/wet in g). In the case of DAAM as reactive co-monomer the above mentioned amounts ADH were additionally dissolved. A pre-bonded raw fleece of cellulosic fibres containing 10% synthetic fibres (polyester) with an area weight of 60 g/m² was used as the substrate. The base polymer dispersions or the blends were diluted with deionised water to a total solids content of 8% before application. The diluted dispersions were then transferred onto the pre-bonded raw fleece via 2 rubber coated cylinders with 50 cm width (Lab Foulard Fa. Mathis). Approximately 100 g of the diluted dispersion were placed in the nip of the 2 rollers and pieces of the raw fleece (30 cm×30 cm) were impregnated by passing through the nip at a velocity of 1.2 m/minute at 2 bar contact pressure. The wet impregnated fleeces were dried for 5 minutes at 90° C. followed by 5 minutes at 140° C. in circulating air ovens. After cooling to room temperature the fleeces were reweighed. The coating weights were calculated from the difference in the weights (12-13 g/m²). For the determination of the tensile strength, 5 strips (50 mm×200 mm) were cut out of each piece of fleece and stored in a climate-controlled room under standard conditions (23° C. at 50% relative air humidity according to DIN EN ISO 139) To determine the wet strength the strips were stored for 30 seconds in deionised water. The tensile strength was then immediately measured on an Instron 5965 with 100 mm clamping length at 100 mm/minute speed. The values for elongation at break [%] and the tensile strength [N/50 mm] after storage in deionised water are given in table 5.

TABLE 5

Overview tear strength

Base polymer without VTMO; reactive co-monomer GMA

| Example | Dispersions | Blend wet/wet | Blend dry/dry | Reactive co-monomer | Wet tear strength |
|---|---|---|---|---|---|
| RE 1 | 1 | 100:0 | 50:0 | 0% GMA | 17.3%/19.7N/50 mm |
| RE 2 | 2 | 100:0 | 50:0 | 3% GMA | 18.9%/23.9N/50 mm |
| RE 3 | 3 | 100:0 | 50:0 | 3% GMA | 16.6%/24.5N/50 mm |
| CE 1 | 1 + 2 | 50:50 | 25:25 | 1.5% GMA | 16.4%/21.1N/50 mm |
| CE 2 | 1 + 3 | 50:50 | 25:25 | 1.5% GMA | 18.1%/24.4N/50 mm |

TABLE 5-continued

Overview tear strength

Base polymer with VTMO; reactive co-monomer GMA

| Example | Dispersions | Blend wet/wet | Blend dry/dry | Reactive co-monomer | Wet tear strength |
|---|---|---|---|---|---|
| RE 4 | 4 | 100:0 | 50:0 | 0% GMA | 15.9%/26.2N/50 mm |
| RE 5 | 5 | 100:0 | 50:0 | 3% GMA | 17.3%/25.5N/50 mm |
| RE 6 | 6 | 100:0 | 50:0 | 3% GMA | 16.9%/26.0N/50 mm |
| CE 3 | 4 + 5 | 50:50 | 25:25 | 1.5% GMA | 16.7%/24.5N/50 mm |
| CE 4 | 4 + 6 | 50:50 | 25:25 | 1.5% GMA | 17.5%/25.6N/50 mm |

Base polymer without VTMO; reactive comonomer GMA

| Example | Dispersions | blend wet/wet | blend dry/dry | reactive co-monomer | Wet tear strength |
|---|---|---|---|---|---|
| RE 1 | 1 | 100:0 | 50:0 | 0% GMA | 17.3%/19.7N/50 mm |
| RE 2 | 2 | 100:0 | 50:0 | 3% GMA | 18.9%/23.9N/50 mm |
| Ex 1 | 1 + 102 | 80:20 | 40:6 | 1.3% GMA | 19.0%/27.6N/50 mm |
| Ex 2 | 1 + 102 | 60:40 | 30:12 | 2.9% GMA | 18.7%/25.8N/50 mm |
| Ex 3 | 1 + 103 | 80:20 | 40:6 | 2.6% GMA | 19.0%/28.0N/50 mm |

Base polymer with VTMO; reactives comonomer GMA

| Example | Dispersions | Blend wet/wet | Blend dry/dry | Reactive co-monomer | Wet tear strength |
|---|---|---|---|---|---|
| RE 4 | 4 | 100:0 | 50:0 | 0% GMA | 15.9%/26.2N/50 mm |
| RE 5 | 5 | 100:0 | 50:0 | 3% GMA | 17.3%/25.5N/50 mm |
| CE 5 | 4 + 101 | 80:20 | 40:6 | 0% GMA | 15.8%/23.7N/50 mm |
| Ex 4 | 4 + 102 | 80:20 | 40:6 | 1.3% GMA | 18.1%/29.6N/50 mm |
| Ex 5 | 4 + 102 | 60:40 | 30:12 | 2.9% GMA | 17.7%/28.1N/50 mm |
| Ex 6 | 4 + 104 | 80:20 | 40:6 | 1.3% GMA | 18.9%/28.7N/50 mm |
| Ex 7 | 4 + 103 | 80:20 | 40:6 | 2.6% GMA | 19.2%/33.4N/50 mm |
| Ex 8 | 4 + 105 | 80:20 | 40:6 | 2.6% GMA | 18.8%/31.3N/50 mm |
| Ex 9 | 4 + 106 | 80:20 | 40:6 | 2.6% GMA | 18.0%/28.4N/50 mm |
| Ex 10 | 4 + 107 | 80:20 | 40:6 | 2.6% GMA | 19.0%/32.9N/50 mm |
| Ex 11 | 4 + 108 | 80:20 | 40:6 | 2.6% GMA | 19.7%/31.2N/50 mm |
| Ex 12 | 4 + 109 | 80:20 | 40:6 | 2.6% GMA | 19.3%/31.1N/50 mm |
| Ex 13 | 4 + 110 | 80:20 | 40:6 | 2.6% GMA | 20.7%/33.9N/50 mm |
| Ex 14 | 4 + 111 | 90:10 | 45:3 | 1.9% GMA | 18.7%/31.1N/50 mm |

Base polymer without VTMO; reactive comonomer DAAM

| Example | Dispersions | Blend wet/wet | Blend dry/dry | Reactive co-monomer | Wet tear strength |
|---|---|---|---|---|---|
| RE 1 | 1 | 100:0 | 50:0 | 0% DAAM | 17.3%/19.7N/50 mm |
| RE 10 | 10 | 100:0 + 0.25 g ADH | 50:0 | 1% DAAM | 17.4%/22.3N/50 mm |
| CE 6 | 1 + 112 | 120:30 + 0.34 g ADH | 60:9 | 0.98% DAAM | 17.4%/22.8N/50 mm |

Base polymer with VTMO; reactive co-monomer DAAM

| Example | Dispers. | Blend wet/wet | Blend dry/dry | Reactive co-monomer | Wet tear strength |
|---|---|---|---|---|---|
| RE 4 | 4 | 100:0 | 50:0 | 0% DAAM | 15.9%/26.2N/50 mm |
| RE 7 | 7 | 100:0 + 0.25 g ADH | 50:0 | 1% DAAM | 16.9%/27.2N/50 mm |
| RE 8 | 8 | 100:0 + 0.50 g ADH | 50:0 | 2% DAAM | 18.4%/29.0N/50 mm |
| CE 5 | 4 + 101 | 80:20 | 40:6 | 0% DAAM | 15.8%/23.7N/50 mm |
| CE 7 | 4 + 113 | 80:20 + 0.15 g ADH | 40:6 | 0.65% DAAM | 15.7%/26.2N/50 mm |
| CE 8 | 4 + 113 | 70:30 + 0.25 g ADH | 35:9 | 1.02% DAAM | 17.0%/26.3N/50 mm |
| CE 9 | 4 + 112 | 120:30 + 0.67 g ADH | 60:9 | 0.98% DAAM | 18.8%/29.0N/50 mm |
| CE 10 | 4 + 115* | 90:25 + 0.25 g ADH | 45:5 | 1.0% DAAM | 17.3%/27.8N/50 mm |
| CE 11 | 4 + 115* | 80:50 + 0.5 g ADH | 40:10 | 2.0% DAAM | 16.5%/27.6N/50 mm |

TABLE 5-continued

Overview tear strength

| | | | | | |
|---|---|---|---|---|---|
| CE 12 | 4 + 116* | 95:12.5 + 0.25 g ADH | 47.5:2.5 | 1.0% DAAM | 16.6%/25.8N/50 mm |
| CE 13 | 4 + 116* | 90:25 + 0.5 g ADH | 45:5 | 2.0% DAAM | 17.7%/27.4N/50 mm |

Base polymer without/with VTMO; reactive comonomer VTMO

| Example | Dispersions | Blend wet/wet | Blend dry/dry | Reactive co-monomer | Wet tear strength |
|---|---|---|---|---|---|
| RE 1 | 1 | 100:0 | 50:0 | 0% VTMO | 17.3%/19.7N/50 mm |
| RE 4 | 4 | 100:0 | 50:0 | 1% VTMO | 15.9%/26.2N/50 mm |
| RE 9 | 9 | 100:0 | 50:0 | 1.5% VTMO | 17.0%/25.2N/50 mm |
| CE 14 | 1 + 114 | 80:20 | 40:6 | 2.6% VTMO | 16.9%/21.4N/50 mm |
| CE 15 | 4 + 114 | 80:20 | 40:6 | 3.47% VTMO | 17.0%/25.3N/50 mm |

*TSC = 20% instead 30%

Reference Examples 11-13, Examples 15-17

In order to show that the concept of the present invention is applicable in a broad range of coarse particle dispersions commercial latex compositions (based on carboxylated nitrile butadiene rubber, styrene acrylic copolymer latex or carboxylated styrene butadiene rubber) were mixed with fine particle dispersions in the weight ratios given in table 6. The wet tear strength of the coated fleece product was tested as described above. The data is also presented in table 6.
Transfer of Concept to Other Base Polymers; Reactive Co-Monomer GMA

TABLE 6

| Example | Dispersions | Blend wet/wet | Blend dry/dry | Reactive co-monomer | Wet tear strength [5 Min 140° C.] |
|---|---|---|---|---|---|
| RE 11 | Litex N 3415 M* (150 nm) | 100:0 | 47.5:0 | 0% GMA | 19.6%/21.0N/50 mm |
| Ex 15 | Litex N 3415 M* + 103 | 80:20 | 38:6 | 2.7% GMA | 21.3%/28.4N/50 mm |
| RE 12 | Revacryl X6300* (160 nm) | 100:0 | 50:0 | 0% GMA | 17.5%/29.9N/50 mm |
| Ex 16 | Revacryl X6300* + 103 | 80:20 | 40:6 | 2.6% GMA | 19.6%/36.3N/50 mm |
| RE 13 | Litex T54X20* (170 nm) | 100:0 | 52.5:0 | 0% GMA | 19.7%/25.6N/50 mm |
| Ex 17 | Litex T 54X20* + 103 | 80:20 | 42:6 | 2.5% GMA | 19.3%/30.1N/50 mm |

*commercially available from Synthomer Deutschland GmbH, Marl, Germany

As can be seen from comparing RE 1-6, CE 1-4 and Ex 1-14 incorporation of an epoxy functional group into coarse latex particles gives some improvement of wet tear strength irrespective of whether a single epoxy functional coarse latex is used or a mixture of coarse latex having no epoxy functional groups and a coarse latex having epoxy functional groups is used. But the examples of the present invention show a considerably greater improvement of wet tear strength if the epoxy functional group is incorporated into the small particle size latex.

As is evident from CE 5-15 this effect is not based simply on mixing latices having different particle sizes. If the latex with small particle size does not bear epoxy functional groups (CE 5) or bears DAAM (CE 6-13) or VTMO (CE 14,15) no improvement compared to using the respective coarse particle latex was achieved.

Contrary to the teaching of the prior art the wet tear strength cannot be increased by mixing latices having correspondingly reactive functional groups. Coarse dispersions 1 and 4 have carboxylic acid groups and no epoxy groups. Coarse dispersions 2 and 5 have carboxylic acid groups and epoxy groups whereas coarse dispersions 3 and 6 have no carboxylic acid groups but epoxy groups. In the rows RE 1-6 and CE 1-4 the best wet tear strength is achieved for RE 3 and RE 6 (but no improvement versus RE 4) having only epoxy groups. The compositions having both carboxylic acid groups and epoxy groups (RE 2, CE1, CE2, RE 5, CE3, CE4) have lower or at least no better wet tear strength. Thus the possible cross-linking reaction between carboxylic acid groups and epoxy groups does not seem to have a positive effect on wet tear strength. Therefore the presence of carboxylic acid groups is not essential but can improve the water dispersibility of the latex.

Furthermore, the independence from acid content is illustrated by similar values of wet tear strength for examples 7, 10 an 11 which are based on blends of the same coarse base polymer (dispersion 4) with small particle size dispersions in the same blending ratio. Example 7 contains dispersion 103 (1 wt.-% MAS), example 10 dispersion 107 (0.5 wt.-% MAS) and example 11 dispersion 108 (3 wt.-% MAS, the weight percentages being based on total weight of monomer).

Finally RE 11-13 and Ex 15-17 show that the concept of the present invention is applicable to a broad range of coarse latices as long as the small particle size latex bears epoxy functional groups.

What is claimed is:
1. A fibre structure selected from fabrics and non-wovens comprising a dried residue of a polymer latex composition comprising:
   a) 50 to 98 wt.-% based on the total weight of latex particles in the composition of the first latex particles having a volume average particle size of 80 to 1000 nm, wherein the first latex particles optionally bear functional groups and if functional groups are present they are selected from the group consisting of acid functional groups and salts, amides or anhydrides thereof; silane functional groups; and combinations thereof;
b) 2 to 50 wt.-% based on the total weight of latex particles in the composition of second latex particles having a volume average particle size of 5 to 70 nm bearing epoxy functional groups, wherein the second latex particles consist of structural units derived from:
i) non-functional monomers selected from the group consisting of non-functional monomers having only one ethylenically unsaturated functional group; and conjugated dienes;
ii) epoxy functional monomers; and optionally
iii) functional monomers other than epoxy functional monomers that contain a functional group that is maintained on the resultant latex particle after emulsion polymerization.

2. The fibre structure of claim 1, wherein the first latex particles are present in an amount of 60 to 95 wt.-% based on the total weight of latex particles in the composition; and the second latex particles are present in an amount of 5 to 40 wt.-% based on the total weight of latex particles in the composition.

3. The fibre structure of claim 1, wherein the structural units derived from ethylenically unsaturated epoxy-functional monomers in the second latex particles are present in an amount of 1-50 wt.-% based on the total weight of monomers for the second latex particles.

4. The fibre structure of claim 1, wherein the first latex particles comprise structural units derived from:
i) non-functional monomers having only ethylenically unsaturated functional groups selected from the group consisting of alkyl (meth)acrylates, vinyl aromatic compounds, conjugated dienes, vinyl esters, olefins, vinyl halides, (meth)acrylonitrile, alkylene di(meth) acrylates, diallyl alkylene compounds, diallyl arylene compounds, divinyl arylene compounds, compounds having at least one allyl group and at least one (meth) acrylate group and combinations thereof; and optionally
ii) functional monomers selected from:
acid functional monomers selected from the group consisting of (meth)acrylic acid, itaconic acid, crotonic acid, maleic acid, fumaric acid, ethylenically unsaturated sulfonic acids, ethylenically unsaturated phosphorous containing acids and salts thereof;
ethylenically unsaturated alkoxy silanes;
(meth)acrylamides; and
combinations thereof.

5. The fibre structure of claim 4, wherein the total amount of functional monomers is up to 5 wt.-% based on the total weight of monomers for the first latex particles.

6. The fibre structure of claim 1, wherein the second latex particles consist of structural units derived from:
i) non-functional monomers having only ethylenically unsaturated functional groups selected from the group consisting of alkyl (meth)acrylates, vinyl aromatic compounds, conjugated dienes, vinyl esters, olefins, vinyl halides, (meth)acrylonitrile, alkylene di(meth) acrylates, diallyl alkylene compounds, diallyl arylene compounds, divinyl arylene compounds, compounds having at least one allyl group and at least one (meth) acrylate group and combinations thereof;
ii) epoxy functional monomers selected from the group consisting of glycidyl (meth)acrylate, allyl glycidylether, vinyl glycidylether, vinyl cyclohexene oxide, limonene oxide, 2-ethylglycidylacrylate, 2-ethylglycidylmethacrylate, 2-(n-propyl)glycidylacrylate, 2-(n-propyl)glycidylmethacrylate, 2-(n-butyl)glycidylacrylate, 2-(n-butyl)glycidylmethacrylate, glycidylmethylmethacrylate, glycidylacrylate, (3',4'-epoxyheptyl)-2-ethylacrylate, (3',4'-epoxyheptyl)-2-ethylmethacrylate, (6',7'-epoxyheptyl)acrylate, (6',7'-epoxyheptyl)methacrylate, allyl-3,4-epoxyheptylether, 6,7-epoxyheptylallylether, vinyl-3,4-epoxyheptylether, 3,4-epoxyheptylvinylether, 6,7-epoxyheptylvinylether, o-vinylbenzylglycidylether, m-vinylbenzylglycidylether, p-vinylbenzylglycidylether, 3-vinyl cyclohexene oxide and combinations thereof; and optionally
iii) functional monomers selected from:
acid functional monomers selected from the group consisting of (meth)acrylic acid, itaconic acid, crotonic acid, maleic acid, fumaric acid, ethylenically unsaturated sulfonic acids, ethylenically unsaturated phosphorous containing acids and salts thereof;
(meth)acrylamides; and
combinations thereof.

7. The fibre structure of claim 4, wherein the non-functional monomers for the first and/or the second latex particles are selected from the group consisting of methyl (meth)acrylate, ethyl (meth)acrylate, n-propyl (meth)acrylate, n-butyl (meth)acrylate, 2-ethylhexyl (meth)acrylate, butadiene, isoprene, styrene, alpha-methyl styrene, vinyl acetate, ethylene, propylene, (meth)acrylonitrile, neodecanoic acid vinylester, 2-ethylhexanoic acid vinylester and combinations thereof.

8. The fibre structure of claim 1, wherein the volume average particle size of the first latex particles is in the range of 100 to 800 nm and/or the volume average particle size of the second latex particles is in the range of 7 to 55 nm.

9. The fibre structure of claim 1, wherein the polymer latex composition is free of external cross-linkers reactive with epoxy groups and said external crosslinkers are selected from the group consisting of polyamines, non-latex polyacids, polythiols and non-latex polyanhydrides.

10. The fibre structure of claim 1 being selected from the group consisting of paper towels, hygienic papers, household papers, wet wipes, diapers, interlinings, waddings, shoulder pads, synthetic leather base material, textile supported gloves, and wood fibre panels.

11. A method for increasing the strength of a fibre structure comprising:
providing a fibre structure selected from fabrics and non-wovens;
applying a composition comprising a polymer latex composition comprising:
a) 50 to 98 wt.-% based on the total weight of latex particles in the composition of the first latex particles having a volume average particle size of 80 to 1000 nm, wherein the first latex particles optionally bear functional groups and if functional groups are present they are selected from the group consisting of acid functional groups and salts, amides or anhydrides thereof; silane functional groups; and combinations thereof;
b) 2 to 50 wt.-% based on the total weight of latex particles in the composition of second latex particles having a volume average particle size of 5 to 70 nm bearing epoxy functional groups, wherein the second latex particles consist of structural units derived from:
i) non-functional monomers selected from the group consisting of non-functional monomers having only one ethylenically unsaturated functional group; and conjugated dienes;

ii) epoxy functional monomers; and optionally iii) functional monomers other than epoxy functional monomers that contain a functional group that is maintained on the resultant latex particle after emulsion polymerization; and coalescing the latex particles on at least a part of the fibres of the fibre structure by drying or heating the fibre structure.

12. The method of claim 11, wherein the composition comprising the polymer latex composition is an aqueous composition having a solids content of 5 to 50 wt.-% based on the total weight of the composition.

13. The method of claim 11, wherein the composition comprising the polymer latex composition is a powder composition in dried form.

14. The method of claim 11, wherein the polymer latex composition is free of external cross-linkers reactive with epoxy groups and said external crosslinkers are selected from the group consisting of polyamines, non-latex polyacids, polythiols and non-latex polyanhydrides.

15. The method of claim 11, wherein the fibre structure is selected from the group consisting of paper towels, hygienic papers, household papers, wet wipes, diapers, interlinings, waddings, shoulder pads, synthetic leather base material, textile supported gloves, and wood fibre panels.

* * * * *